United States Patent
Walker

[15] 3,688,753
[45] Sept. 5, 1972

[54] ENGINE SPARK TIMER
[72] Inventor: Brooks Walker, 1280 Columbus Ave., San Francisco, Calif. 94133
[22] Filed: May 26, 1969
[21] Appl. No.: 827,505

Related U.S. Application Data
[63] Continuation-in-part of Ser. No. 672,818, Oct. 4, 1967.

[52] U.S. Cl. ..........................123/117 A, 123/97 B
[51] Int. Cl. .............................................F02p 5/04
[58] Field of Search ..........................123/97 B, 117.1

[56] References Cited

UNITED STATES PATENTS

| | | | |
|---|---|---|---|
| 3,046,962 | 7/1962 | Norris | 123/117.1 |
| 3,252,451 | 5/1966 | Sarto | 123/117.1 |
| 3,329,136 | 7/1967 | Cadiou | 123/117.1 |

*Primary Examiner*—Laurence M. Goodridge
*Attorney*—Everett G. Clements

[57] ABSTRACT

This invention pertains to means for obtaining partial engine developed intake suction operated spark advance, and therefore a partial suction operated spark advance, during decelerations at engine idle throttle positions above a predetermined engine speed, as compared to full intake manifold suction spark advance as used in some engines today, for reduced exhaust emissions while sensing engine decelerations above said selected engine speed by the increase in intake suction above idle engine suction or cruising intake suction and reducing said intake suction acting on the suction operated spark advance motor to reduce the suction operated spark advance by a suction regulator put into the circuit to said suction operated spark advance motor when decelerating above a selected engine speed as sensed by said intake suction sensor.

3 Claims, 1 Drawing Figure

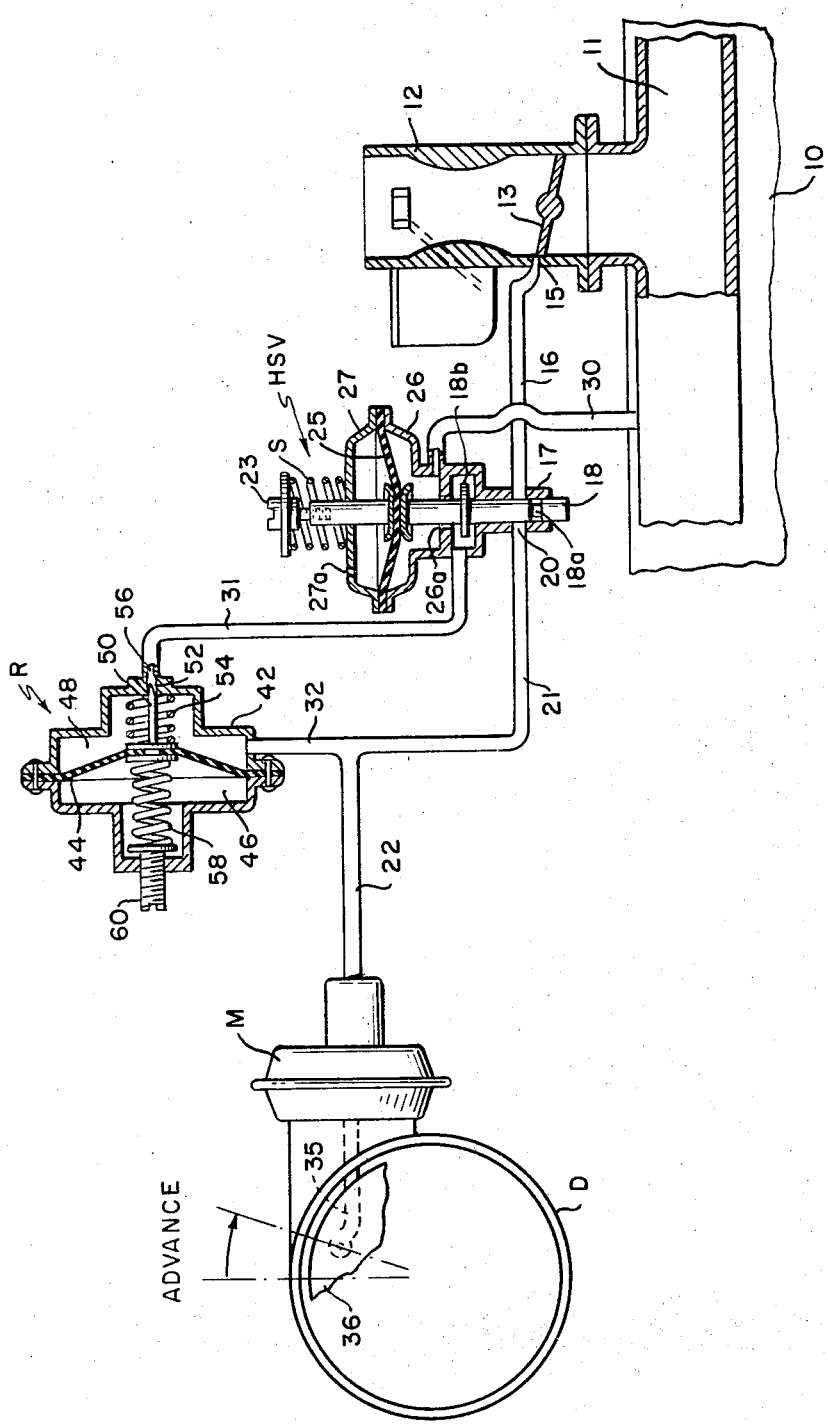

ENGINE SPARK TIMER

This application is a continuation in-part of my application Ser. No. 672,818, filed Oct. 4, 1967.

An object of this invention is to use a simple deceleration sensor of an above idle or cruise intake suction-type, to sense a deceleration above a selected engine speed and to connect a suction regulator between the intake manifold and the suction operated spark advance mechanism to thereby obtain a limited suction operated spark advance during deceleration above a selected engine speed as a means for obtaining a less than full suction operated spark advance during such decelerations to produce lower exhaust emissions than if full suction operated spark advance were used during such decelerations as is common on some reduced smog producing engines today.

Another object is the use of a simple suction regulator that can be adjusted for any suction from near full intake manifold suction to a greatly reduced suction from intake suction in order to regulate the action of the suction operated spark advance mechanism during some engine operating cycles such as decelerations above a selected engine speed to control the amount of intake manifold limited suction activated spark advance during some engine operations, such as closed or engine idle throttle position and decelerations above a selected engine speed, in order to reduce the smog producing exhaust emissions as compared to such exhaust emissions if said limited suction operated spark advance had been full intake suction advance.

Other objects of the invention will be more particularly pointed out in the accompanying specification and claims.

I have illustrated my invention in the accompanying drawing in which I have shown one form of the invention partly in elevation and partly schematic.

In this drawing I have shown:

An internal combustion engine 10 with an intake manifold 11, a carburetor 12, a throttle valve 13, a high spark advance port 15 just above the high edge of butterfly 13 on down shaft carburetor 12 is connected to tube 16 which is connected to high suction sensing motor and valve HSV at port 17. Plunger 18 has ring recess 18a. Port 20 is connected by tube 21, and tube 22 to suction operated spark advance motor M. Spring S in motor valve HSV is regulated by screw 23 to hold up plunger 18 and the center of diaphragm 25 and valve 18b. Upper housing 26 supports spring S and clamps diaphragm 25 to lower housing 27 by suitable means. Port 27a vents the upper side of diaphragm 25 to atmosphere. Spring S pressure upon stem 18 and valve 18b to hold valve 18b on seat 26a with such force that it takes a suction above idle or cruise to suck diaphragm 25 down to open valve 18b below seat 26a at about 21" Hg or a higher suction, as shown. Such a suction exists at closed throttle decelerations above a selected engine speed and valve 18b is open below seat 26a so suction from intake manifold 11 flows through tube 30, past seat 26a, to tube 31 into suction regulator R. Suction regulator R can regulate the suction passing through it to anything from manifold 11 suction to a suction insufficient to operate spark advance motor M. Line 32 and line 22 connect regulator R to motor M, as shown. When such deceleration suction is effective, there being very little suction at port 15 which is cut off from the suction in manifold 11 by throttle 13, the path from port 15 in carburetor 12 to motor M is closed by plunger 18 lowering recess 18a below ports 17 and 20 to provide cut off between lines 16 and 21, so that suction flows from line 30 past seat 26a, valve 18a, line 31, through regulator R which reduces intake suction and on to motor M by lines 32 and 22. This gives limited suction operated spark advance by motor M, arm 35 and breaker plate 36 of the spark distributor D during such closed throttle decelerations.

The suction regulator comprises a housing 42 having a dividing diaphragm 44 secured therein to form chambers 46 and 48. A needle valve 50 is carried by the diaphragm for cooperation with a valve seat 52 formed in the housing. A spring 54 in chamber 48 urges the diaphragm toward the left as viewed in the drawing to open the valve passage 56 for the flow of fluid between conduits 31 and 32. A spring 58 in chamber 46 urges the diaphragm toward the right to close the valve passage by the seating of valve 50 on seat 52. The spring 58 is adjusted by a screw 60 to provide the proper bias to counteract the force of spring 54 to regulate the suction for controlling the passage 56 to flow of fluid. Spring 54 holds valve 50 open until suction and spring 58 closes the valve 50 against its seat.

Other devices use a high suction sensor valve similar to HSV but turn full engine manifold suction into the spark advance motor on such decelerations for full stroke suction spark advance, whereas this invention allows any portion of the suction operated spark advance stroke to be used for best exhaust emissions control during decelerations.

I have illustrated my inventions in these various forms, however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim:

1. A spark advance mechanism for an internal combustion engine, an intake manifold including a carburetor, a spark advance port in said carburetor, a suction operated spark advance motor, a first suction circuit connecting the port to the spark advance motor, a high suction sensing valve for sensing the intake manifold suction, said valve being responsive to suction in the intake manifold above a predetermined amount for switching said spark advance motor from the first circuit to a second circuit including a suction regulator for regulating the suction applied to the motor, and including means to limit the spark advance to a preselected amount.

2. A spark advance for an internal combustion engine in which there is an intake manifold, a first valve, a suction operated spark advance motor, an intake manifold suction regulator second valve, an intake manifold suction sensor for rendering said first valve operative, in response to intake manifold suction above engine cruise and engine idle suctions, to connect said second valve in series with said intake manifold and said spark advance motor to obtain a less than full intake suction spark advance by said suction operated spark advance motor said suction regulator including means for limiting the suction applied to the motor to a preselected maximum, further including a carburetor, a spark advance operating port in said carburetor, conduit means connecting said port to the spark advance motor, a third valve connected to said sensor and in said conduit means for conjoint operation with said first valve, said third valve opening said conduit means to permit flow of fluid from said port to said advance motor on cruises and power operation of said internal combustion engine while said first valve is closed.

3. A spark timing control for an internal combustion engine, an intake manifold, a carburetor, a throttle for said carburetor, a suction operated spark advance motor, a port in the wall of the carburetor upstream of said throttle valve when said throttle valve is in the engine idle position, a conduit connecting the port to said spark advance motor, a control valve in said conduit, and means for closing the valve in said conduit upon a predetermined suction in said intake manifold to prevent fluid flow in the conduit from said port to said motor and means for opening said valve in said conduit in response to a lesser suction in the manifold to allow fluid flow in the conduit, conduit means connecting the intake manifold and motor, a suction regulator in said conduit means for reducing the manifold suction to a selectable level for application to the motor, and means for supplying manifold pressure to the regulator when the control valve is closed for advancing the spark a predetermined limited amount.

* * * * *